United States Patent [19]

Becker

[11] Patent Number: 4,534,866
[45] Date of Patent: Aug. 13, 1985

[54] DEPOSIT CONTROL METHOD

[75] Inventor: Larry W. Becker, Syracuse, N.Y.

[73] Assignee: Betz Laboratories, Inc., Trevose, Pa.

[21] Appl. No.: 467,528

[22] Filed: Feb. 17, 1983

[51] Int. Cl.$^3$ ................................................ C02F 5/14
[52] U.S. Cl. .................................... 210/697; 210/699; 210/700; 210/701; 252/180; 252/181
[58] Field of Search ................................ 210/697–701; 252/180, 181; 422/15, 17

[56] References Cited

U.S. PATENT DOCUMENTS

| | | | |
|---|---|---|---|
| 4,029,577 | 6/1977 | Godlewski et al. | 210/701 |
| 4,159,946 | 7/1979 | Smith et al. | 210/699 |
| 4,207,405 | 6/1980 | Masler et al. | 210/699 |
| 4,209,398 | 6/1980 | Ii et al. | 422/17 |
| 4,239,648 | 12/1980 | Marshall et al. | 422/15 |
| 4,277,359 | 7/1981 | Lipinski | 210/699 |
| 4,372,870 | 2/1983 | Snyder et al. | 210/701 |

*Primary Examiner*—Peter Hruskoci
*Attorney, Agent, or Firm*—Alexander D. Ricci; Bruce E. Peacock

[57] ABSTRACT

A water system deposit control method and composition of high calcium tolerance are herein disclosed. The composition comprises a reaction product formed from acrylic acid, hydroxylated lower alkyl acrylate and hypophosphorous acid. In accordance with the method herein, an effective amount, from about 0.1–500 ppm of the composition is added to the water system, e.g., cooling water system, so as to inhibit the build-up or agglomeration of undesirable deposits along the metal surfaces on contact with the water.

11 Claims, No Drawings

DEPOSIT CONTROL METHOD

FIELD OF THE INVENTION

The present invention pertains to a method for controlling undesirable deposit formation in water systems and along metal surfaces and the like in contact with such systems.

BACKGROUND OF THE PRESENT INVENTION

As is well known in the art, water systems contain ingredients, either naturally occurring, as contaminants, or formed by the combination of anions and cations, which can and often do cause deposition problems.

For example, depending on the water source and process conditions, industrial water can contain alkaline earth metal or transition metal cations such as calcium, barium, magnesium, iron, etc. and such anions as carbonate, phosphate, sulphate, oxalate, silicate, etc. The combination of these anions and cations could, accordingly, form such potential depositing salts as calcium carbonate, calcium sulphate, calcium phosphate, magnesium carbonate, magnesium sulphate, etc. When the concentration of any of such salts which are formed exceeds their solubility limit, they precipitate out of the water in the form of scale. The concentration of these scale forming salts can increase as a result of partial water evaporation, or changes in pH, temperature or pressure of the water. The amount of scale formation generally depends on pH, temperature and type of salt formed. The scale thus formed will deposit on surfaces in contact with the aqueous medium, such as flow pipes, storage tanks, heat exchanger surfaces, etc. These deposits can prevent effective heat transfer, interfere with fluid flow through pipes, facilitate corrosion, and harbor bacteria.

Deposit control agents, such as phosphates, phosphonates, and polyacrylates, show similar responses as the concentration of calcium is increased in cooling waters and the like with the potential for precipitation of slightly soluble calcium salts. At very low (substoichiometric) treatment levels, these deposit control materials inhibit the nucleation and growth of crystals of calcium salts. The mechanism for this activity involves adsorption of the deposit control agent at the active growth site of the forming microcrystallites. If the concentration of calcium is increased, turbidity develops in the cooling water, indicating the formation of insoluble, calcium-deposit control agent adducts. If the deposit control agent concentration is increased to stoichiometric concentrations, this turbidity can be removed by chelation of the calcium ion to produce soluble calcium-containing species.

Because of the economics of water treatment in cooling systems, deposit control agents must function at substoichiometric concentrations. In waters containing high calcium concentrations, such as might be found in cooling systems operating at high cycles of concentration, calcium tolerant deposit control agents offer a distinct advantage. The concentration of these materials can be increased to meet the deposit control demands of the system without concern for their removal by formation of calcium containing adducts.

Formation of calcium-deposit control agent adducts has obvious negative consequences. The active or "free" deposit control agent concentration is limited, thus limiting deposition and corrosion control. Also, the adduct itself may foul the cooling system through the formation of an adduct deposit.

To alleviate this problem, the calcium concentration is often controlled by operating at lower cycles of concentration. However, such procedure also has obvious economic disadvantages.

Thus, a deposit control agent that is tolerant to high calcium concentrations provides definite advantages when used in cooling water systems and the like. The high treatment concentrations that may be required due to the deposition potential created by high calcium concentrations can be used without fear of fouling or loss of corrosion protection. Cycles of concentration need not be limited, providing economic benefits and conservation of water.

Accordingly, there is a need in the art for a method of controlling deposition in high calcium ion content waters, which method does not result in the substantial formation of adducts comprised of calcium ions and the deposit control agent.

Most of the present-day corrosion inhibitor treatments comprise a phosphate and/or phosphonic acid constituent. Phosphate may also be contained within the makeup water, e.g., tertiary sewage treatment effluent. The reversion of the polyphosphates and the organic phosphates plus the use of alkaline operating conditions leads to the formation and deposition of highly insoluble calcium phosphate. Accordingly, there is a need in the art for a deposit control treatment which inhibits the formation of calcium phosphate deposits.

PRIOR ART

Acrylic acid deposit control agents are well known in the art. In addition, acrylic acid/orthophosphorous acid reaction products and acrylic acid/hypophosphorous acid reaction products have been suggested for use as deposit control treatment agents. U.S. Pat. Nos. 4,239,648 (Marshall et al); 4,159,946 (Smith et al), 4,277,359 (Lipinski) and 4,207,405 (Masler) exemplify such treatments.

The use of acrylic acid/hydroxylated lower alkyl acrylate copolymers as deposit control agents has been taught by U.S. Pat. No. 4,029,577 (Godlewski et al). Similarly, U.S. Pat. No. 4,209,398 (Ii et al) discloses utilization, as water treating compounds, of a polymer containing a structural unit that is derived from a monomer having an ethylenically unsaturated bond and has one or more carboxyl radicals, at least a part of the carboxyl radicals being modified by the inclusion therein of an oxyalkylene radical. One copolymer specifically disclosed by Ii et al is the sodium salt of acrylic acid/2-hydroxypropylacrylate/2-hydroxypropylacrylate monophosphate.

Despite the advent and use of the above-noted acrylic acid based water treatment agents, there remains a need in the art for a deposit control agent that is highly calcium tolerant and which is effective, especially, in inhibiting calcium phosphate scale. To my knowledge, an acrylic acid/hydroxylated lower alkyl acrylate/hypophosphorous acid reaction product has not been proposed or used by others heretofore. I have found that, surprisingly, such reaction product efficiently inhibits calcium phosphate deposition and is highly calcium tolerant. This is in fact surprising since, as the following examples indicate, the acrylic acid/hydroxylated lower alkyl acrylate/hypophosphorous acid reaction products I have discovered exhibit enhanced activity in calcium tolerance and calcium phosphate inhibition tests in sharp contrast to the results attendant upon use of either the acrylic acid/hypophosphorous acid reaction products exemplified in U.S. Pat. No. 4,239,648 (Marshall et al) and U.S. Pat. No. 4,159,946 (Smith et al) or the acrylic acid/2-hydroxypropylacrylate copolymers disclosed in U.S. Pat. No. 4,029,577 (Godlewski et al).

DETAILED DESCRIPTION

The acrylic acid/hydroxylated lower acrylate/hypophosphorous ($H_3PO_2$) reaction products of the present invention are "calcium tolerant". This phrase is used to signify the fact that the reaction product remains in solution in waters having calcium ion concentrations of 300 ppm and greater without forming an undesirable precipitate. Accordingly, the reaction product can exert its deposit control function in such waters without interference due to formation of calcium-deposit control agent adducts.

Although few naturally occurring waters possess calcium ion concentrations on the order of 300 ppm and greater, such water systems are typically encountered in recirculating-type cooling water systems, which for economical and environmental purposes, are forced to operate at high levels of concentration. Although the present method is ideally suited to provide effective deposit control protection in these particular systems, the method is equally applicable to all water systems for which deposit control protection is sought that possess such high calcium ion concentrations. For instance, boiler water systems, scrubber systems, salt water desalination, dust collecting systems, reverse osmosis, and other water systems may benefit from the present invention.

It is noted that the term "reaction product" as used herein should be construed to encompass the acrylic acid/hydroxylated lower acrylate/$H_3PO_2$ reaction products of the present invention and all water soluble salt forms of this reaction product.

The reaction product is formed via reaction of acrylic acid, the desired hydroxylated lower alkyl acrylate, and hypophosphorous acid ($H_3PO_2$), in a solvent which is inert under the reaction conditions. An initiator which decomposes to yield free radicals is also added to the solvent. Suitable solvents include water, aqueous ethanol or dioxan. Suitable initiators include bisazoisobutyronitrile, organic peroxides such as benzoyl peroxide, methyl ethyl ketone peroxide, ditertiary butyl peroxide and monobutyl hydroperoxide, and oxidizing agents such as hydrogen peroxide, sodium perborate and sodium persulphate.

The reaction products of the present invention are obtained as solutions. The reaction products can then be isolated via conventional techniques including partial or complete evaporation of the solvent. It is to be understood, however, that the reaction products of the invention can be used in their "unpurified" form.

Salts of the reaction products, in which some or all of the acidic hydrogen atoms have been replaced by cations such as alkali metal ions, ammonium ions or quaternized amine radicals, may also be used. Such salts may be prepared by mixing an aqueous or alcoholic solution of the reaction product with an aqueous or alcoholic solution containing an amount of the requisite base in excess of, equal to or less than the stoichiometric requirement. The solvent may then be removed by evaporation. It is noted that in many of the water systems in which the reaction products of the present invention will be used, the water is sufficiently alkaline to effect neutralization.

The exact structure of the reaction product is not entirely clear. Indeed, the lack of sufficient model compounds, with which the instant reaction product could be compared, renders n.m.r. examination speculative.

As to the reactants themselves, acrylic acid may be readily prepared by hydrolysis of acrylonitrile. It is commercially available from many sources.

The phrase hydroxylated lower alkyl acrylate relates to an acrylate moiety containing from one to about four carbon atoms in the pendant alkyl group. Any of the carbon atoms of the alkyl group may be provided with an hydroxy function. The hydroxylated lower alkyl acrylate may be prepared via addition reaction between acrylic acid or its derivatives or water soluble salts and the oxide of the alkylene derivative desired. The preferred hydroxylated lower alkyl acrylate is 2-hydroxypropylacrylate. This may be prepared by reacting acrylic acid with propylene oxide.

Hypophosphorous acid, $H_3PO_2$, may be prepared by treating $NaH_2PO_2$ with an ion-exchange resin. It is commercially marketed in aqueous solutions of varying concentration.

The reaction product of the present invention may be effectively utilized as a highly calcium tolerant deposit control inhibition agent by adding an effective amount thereof, between about 0.1–500 parts of the reaction product per one million parts of the aqueous medium, to the desired water system. Preferably, the reaction product is added in an amount of between about 2.5–100 parts per million of water contained within the aqueous system to be treated.

It is thought that the present reaction product may be used in conjunction with the process parameters noted in U.S. Pat. No. 4,303,568 (May et al) to attain the desired but elusive passivated oxide film on metal surfaces in contact with the treated aqueous medium. It is postulated that the reaction product may be combined with, or used in lieu of, the copolymer specified in the '568 May et al patent. The entire disclosure of U.S. Pat. No. 4,303,568 (May et al) is accordingly herein incorporated by reference.

The reaction products of the present invention can also be used with other components in order to enhance the corrosion inhibition and scale controlling properties thereof. For instance, the reaction products may be used in combination with one or more kinds of compounds selected from the group consisting of inorganic phosphoric acids, phosphonic acid salts, organic phosphoric acid esters, and polyvalent metal salts.

Examples of such inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the reaction products of the present invention, there may be mentioned aminopolyphosphonic acids such as aminotrimethylene phosphonic acid, ethylene diamine tetramethylene phosphonic acid and the like, methylene diphosphonic acid, hydroxy ethylidene-1,1-diphosphonic acid, 2-phosphonobutane-1,2,4-tricarboxylic acid, etc.

Exemplary organic phosphoric acid esters which may be combined with the reaction products of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines.

Inorganic phosphoric acid, phosphonic acid, and organic phosphoric acid esters may be salts, preferably salts of alkali metal, ammonia, amine and so forth.

Exemplary polyvalent metal salts which may be combined with the reaction products above include those capable of dissociating polyvalent metal cations in water such as $Zn^{++}Ni^{++}$etc., which include zinc chloride, zinc sulfate, nickel sulfate, nickel chloride and so forth.

When the reaction product is added to the aqueous system in combination with an additional component selected from the group consisting of inorganic phosphoric acids, phosphonic acids, organic phosphoric acid esters, or their water-soluble salts (all being referred to hereinafter as phosphoric compounds), and polyvalent metal salts, a fixed quantity of said reaction product may be added separately and in the state of aqueous solution into the system. The reaction product may be added either continuously or intermittently. Alternatively, the reaction product may be blended with the above noted phosphoric compounds or polyvalent metal salts and then added in the state of aqueous solution into the water system either continuously or intermittently. The phosphoric compounds or polyvalent metal salts are utilized in the usual manner for corrosion and scale preventing purposes. For instance, the phosphoric compounds or polyvalent metal salts may be added to a water system continuously or intermittently to maintain their necessary concentrations.

Generally, the phosphoric compounds should be present in the aqueous system in an amount of about 1-100 ppm (as $PO_4$) or the polyvalent metal salts should be present in an amount of about 1 to 50 ppm (as metal cation).

As is conventional in the art, the phosphoric compounds or polyvalent metal salts may be added, as pretreatment dosages, to the water system in an amount of about 20 to about 500 ppm, and thereafter a small quantity of chemicals may be added, as maintenance dosages.

The reaction product may be used in combination with conventional corrosion inhibitors for iron, steel, copper, copper alloys or other metals, conventional scale and contamination inhibitors, metal ion sequestering agents, and other conventional water treating agents. Exemplary corrosion inhibitors comprise chromates, bichromates, tungstate, molybdates, nitrites, borates, silicates, oxycarboxylic acids, amino acids, catechols, aliphatic amino surface active agents, benzotriazole, and mercaptobenzothiazole. Other scale and contamination inhibitors include lignin derivatives, tannic acids, starch, polyacrylic soda, polyacrylic amide, etc. Metal ion sequestering agents include ethylene diamine, diethylene triamine and the like and polyamino carboxylic acids including nitrilo triacetic acid, ethylene diamine tetraacetic acid, and diethylene triamine pentaacetic acid.

SPECIFIC EMBODIMENTS

The invention will now be further described with reference to a number of specific examples which are to be regarded solely as illustrative, and not as restricting the scope of the invention.

Example One—Reaction Product Preparation

A mixture of 22.5 g. hydroxypropylacrylate (0.173 mole) and 37.9 g. acrylic acid (0.521 mole) was first prepared. Six grams of this mixture was then added to a reaction flask containing 40.1 g. $H_2O$, 13.2 g. hypophosphorous acid ($H_3PO_2$), and 0.38 g. benzoyl peroxide. The reaction flask was equipped with a magnet, condenser, $N_2$ sparge, addition funnel and thermometer. The mixture was heated to about 95°-98° C. No clear cut exotherm to reflux could be observed. At reflux (100° C.), the remainder of the hydroxypropylacrylate-acrylic acid mixture was added to the reaction flask in dropwise manner through the addition funnel. After approximately 5-10 ml of this dropwise addition, rapid refluxing was observed. The solution in the reaction flask appeared more viscous. The remainder of the hydroxypropylacrylate-acrylic acid mixture was added slowly over a period of about 10 minutes. Refluxing was noted to increase as the addition rate was increased. This indicated that polymerization was occurring. Refluxing (100° C.) was continued for another 3 hours. The reaction product was then allowed to remain at ambient overnight. The product obtained was a solution containing about 54.5% solids. The molecular weight (Mw) of the solids was determined by gel permeation chromatography to be about 47,000 with the Mn value being determined to be 4,400.

Example Two—Calcium Tolerance Efficacy

As previously mentioned, in treated aqueous systems containing high calcium hardness conditions, the potential exists for the uncontrolled precipitation of calcium-deposit control agent adducts. As the need is created to add more deposit control agent to prevent deposit agglomeration throughout the treated water system, this problem of uncontrolled calcium-deposit control agent adduct formation is exacerbated.

The following table demonstrates the ability of the AA/HPA/$H_3PO_2$ reaction product, in contrast with other well known deposit control agents, in withstanding various calcium concentrations at 60° C. The test procedure used to determine calcium tolerance of the materials was as follows: solutions containing 400 ppm $Ca^{+2}$ and 2,000 ppm $Ca^{+2}$ were prepared at pH=9. To these solutions, 20 ppm (actives) of each desired treatment were added and the pH was readjusted to 9 with NaOH if necessary. The solutions were placed in a water bath at 60° C. for 10 minutes. The presence of precipitation was detected by the Tyndall effect.

| Treatment | Calcium Tolerance | |
|---|---|---|
| | 400 ppm $Ca^{+2}$ | 2,000 ppm $Ca^{+2}$ |
| AA/HPA/$H_3PO_2$ reaction product - product of Example One | Clear | Clear |
| Copolymer acrylic acid/ 2-hydroxypropylacrylate, AA:HPA mole ratio 2:1, nominal molecular weight 6,000 | Clear | Clear |
| Dequest 2010 | Very cloudy | Very cloudy |

-continued

| Treatment | Calcium Tolerance | |
|---|---|---|
| | 400 ppm $Ca^{+2}$ | 2,000 ppm $Ca^{+2}$ |
| Dequest 2000 | Very cloudy | Very cloudy |
| AA/HPA/$H_3PO_2$ reaction product - Example One - second run | Slight turbidity | Slight turbidity (worse than at 400 ppm) |
| Beclene 500 | Slight turbidity (worse than AA/HPA/$H_3PO_2$ reaction product - second run at 400 ppm $Ca^{+2}$) | Slight turbidity (equivalent to AA/HPA/$H_3PO_2$ reaction product - second run at 2000 ppm $Ca^{+2}$) |

Dequest 2010 = hydroxyethylidenediphosphonic acid; available Monsanto
Dequest 2000 = nitrilo-tris (methylene phosphonic acid); available Monsanto
Beclene 500 = phosphinocarboxylic acid having structure

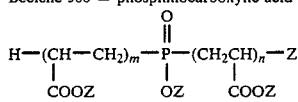

wherein Z is H or a cation, and wherein the sum of n & m is about 2 to 6. See U.S. Pat. No. 4,239,648 and U.S. Pat. No. 4,159,946. This product is commercially available from Ciba-Geigy.

Example Three—Calcium Phosphate Inhibition

To evaluate the deposit control efficacy of the AA/HPA/$H_2PO_3$ reaction product of the present invention, tests were undertaken to measure the product's ability to prevent bulk phase precipitation of calcium phosphate, under conditions which would normally result in the precipitation of this particular salt. In this respect, it is important to recognize that the AA/HPA/$H_2PO_3$ reaction product was evaluated at "substoichiometric" concentrations. Prevention of bulk phase precipitation at such "substoichiometric" levels is known in the art as "threshold" treatment.

The results in the following table are expressed as "percent inhibition" with positive values indicating that the stated percentage of precipitate was prevented from being formed.

The following conditions, solutions, and testing precedure were utilized to perform the calcium phosphate inhibition test.

| CALCIUM PHOSPHATE INHIBITION PROCEDURE | |
|---|---|
| Conditions | Solutions |
| T = 70° C. | 36.76 $CaCl_2 \cdot 2H_2O$/liter $DIH_2O$ |
| pH 7.5 | 0.4482 g $Na_2HPO_4$/liter $DIH_2O$ |
| 17 hour equilibrium | |
| $Ca^{+2}$ = 100 ppm (as $Ca^{+2}$) | |
| $PO_4^{-3}$ = 6 ppm | |

Procedure (1) To about 1800 ml $DIH_2O$ in a 2 liter volumetric flask, add 20 ml of $CaCl_2 \cdot 2H_2O$ solution followed by 2 drops of conc HCl.
(2) Add 40 ml of $Na_2HPO_4$ solution.
(3) Bring volume to 2 liters with DI water.
(4) Place 100 ml aliquots of solution in 4 oz. glass bottles.
(5) Add treatment.
(6) Adjust pH as desired.
(7) Place in 70° C. water bath and equilibrate for 17 hours.
(8) Remove samples and filter while hot through 0.2 filters.
(9) Cool to room temperature and take Absorbance measurements using Leitz photometer (640 nm).
Preparation for Leitz:
 a. 5 mls filtrate
 b. 10 mls Molybdate Reagent
 c. 1 dipper Stannous Reagent
 d. Swirl 1 minute, pour into Leitz cuvette; wait 1 minute before reading.
(10) Using current calibration curve (Absorbance vs. ppm $PO_4^{-3}$) find ppm $PO_4^{-3}$ of each sample.

Calculation $$\% \text{ Inhibition} = \frac{\text{ppm } PO_4^{-3}(\text{treated}) - \text{ppm } PO_4^{-3}(\text{control})}{\text{ppm } PO_4^{-3}(\text{stock}) - \text{ppm } PO_4^{-3}(\text{control})} \times 100$$

TABLE

| | Calcium Phosphate Inhibition | | |
|---|---|---|---|
| | % Inhibition | | |
| Treatment | 5 ppm Actives | 10 ppm Actives | 20 ppm Actives |
| AA/HPA/$H_2PO_3$ reaction product of Example One | 13 | 46 | 87 |
| Belclene 500 | 0 | 9.4 | 12 |
| Copolymer acrylic acid/2-hydroxypropylacrylate, AA:HPA mole ratio 2:1, nominal molecular weight ≈ 6,000 | 40 | 59 | 60 |

Example Two demonstrates that the AA/HPA/$H_3PO_2$ reaction product of the present invention is comparable to the Belclene 500 and copolymer treatments listed in the example insofar as calcium tolerance is concerned. The reaction product of the present invention is clearly superior to the well known Dequest 2010 and Dequest 2000 materials in this characteristic.

Example Three is indicative of the enhanced calcium phosphate inhibition characteristics afforded by the reaction product. In contrast, Belclene 500, a well-known deposit control agent falls far short in this category. In fact, the performance of the reaction product, with regard to this inhibition trait, is even better than the noted copolymeric treatment at 20 ppm. It is to be noted that this particular copolymeric treatment is widely regarded as presently providing optimal scale control inhibition. Accordingly, it is apparent that the reaction product of the present invention is a highly effective threshold agent for deposit inhibition.

While I have shown and described herein certain embodiments of the present invention, it is intended that there be covered as well any change or modification therein which may be made without departing from the spirit and scope of the invention as defined in the appended claims.

I claim:

1. Method of controlling the deposition of calcium phosphate on the structural parts of a system exposed to an aqueous medium prone to said deposition, said aqueous medium comprising a calcium ion concentration of about 400 ppm calcium (as $Ca^{+2}$) and greater, said method comprising adding to said aqueous medium an effective amount for the purpose of a water soluble reaction product formed from acrylic acid, an hydroxylated lower alkyl acrylate and hypophosphorous acid, the molar ratio of acrylic acid:hydroxylated lower alkyl acrylate:hypophosphorous acid being about 3: about 1: about 1, and the number average molecular weight of said reaction product being about 4,400, said water soluble reaction product being capable of controlling said calcium phosphate deposition without resulting in substantial adduct formation with said calcium.

2. Method as defined in claim 1 wherein said hydroxylated lower alkyl acrylate comprises 2-hydroxypropylacrylate.

3. Method as defined in claim 1 wherein said reaction product is added to said aqueous medium in an amount of about 0.1–500 parts reaction product per one million parts of said aqueous medium.

4. Method as defined in claim 3 wherein said system is a steam generating system.

5. Method as defined in claim 3 wherein said system is a cooling water system.

6. Method as defined in claim 3 wherein said system is a gas scrubbing system.

7. Method as defined in claim 3 further comprising adding to said system, an effective amount for the purpose, of a topping compound selected from the group consisting of inorganic phosphoric acids and water soluble salts thereof, phosphonic acids and water soluble salts thereof, organic phosphoric acid esters and water soluble salts thereof, and polyvalent metal salts capable of being dissociated to polyvalent metal ions in water.

8. Method as defined in claim 7 wherein said inorganic phosphoric acid (II) is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

9. Method as defined in claim 7 wherein said phosphonic acid (II) is a member selected from the group consisting of ethylene diamine tetramethylene phosphonic acid, methylene diphosphonic acid, hydroxyethylidene-1,1-diphosphonic acid and 2-phosphonobutane 1,2,4,-tricarboxylic acid.

10. Method as defined in claim 7 wherein said polyvalent metal salt is a member selected from the group consisting of zinc chloride, nickel chloride, zinc sulfate and nickel sulfate.

11. Method as defined in claim 7 wherein said compound (II) is added to said system in an amount of 20 to about 500 parts per million parts of said system.

* * * * *